United States Patent [19]

Peigneur et al.

[11] Patent Number: 4,803,104
[45] Date of Patent: Feb. 7, 1989

[54] ARTICLE FOR JOINING DIMENSIONALLY RECOVERABLE PARTS

[75] Inventors: Paul G. L. Peigneur, Saint-Truiden; Yvo F. H. Leest, Binkom; Jozef F. L. Van Beersel, Temse, all of Belgium

[73] Assignee: N.V. Raychem SA, Belgium

[21] Appl. No.: 61,605

[22] Filed: Jun. 19, 1987

Related U.S. Application Data

[63] Continuation of Ser. No. 738,928, May 29, 1985, abandoned.

[30] Foreign Application Priority Data

May 29, 1984 [GB] United Kingdom ............... 8413687
Apr. 4, 1985 [GB] United Kingdom ............... 8508955

[51] Int. Cl.$^4$ .................. B32B 3/00; B32B 31/00
[52] U.S. Cl. .................. 428/35.1; 156/86; 156/215; 156/327; 428/57; 428/66; 428/285; 428/286; 428/138; 428/145; 428/212; 428/516
[58] Field of Search ............... 174/DIG. 8; 428/36, 428/57, 63, 66, 212, 246, 251, 285, 286, 138, 145, 516; 156/85, 86, 215, 218, 304.3, 327, 272

[56] References Cited

U.S. PATENT DOCUMENTS

| 3,483,018 | 12/1969 | Waldman | 428/286 |
| 4,012,553 | 3/1977 | Clemens | 428/63 |
| 4,082,521 | 4/1978 | Mcbaney | 428/57 |
| 4,200,676 | 4/1980 | Caponigro et al. | 428/57 |
| 4,233,356 | 11/1980 | Jacobs | 428/252 |
| 4,373,554 | 2/1983 | Cook | 138/137 |
| 4,424,246 | 1/1984 | Pieslak et al. | 428/63 |
| 4,472,468 | 9/1984 | Tadler et al. | 174/DIG. 8 |
| 4,522,870 | 6/1985 | Esmay | 428/252 |

FOREIGN PATENT DOCUMENTS

| 23788 | 2/1981 | European Pat. Off. |
| 49609 | 4/1982 | European Pat. Off. |
| 78695 | 5/1983 | European Pat. Off. |
| 137648 | 4/1985 | European Pat. Off. |
| 143457 | 6/1985 | European Pat. Off. |
| 3217801 | 11/1983 | Fed. Rep. of Germany |

*Primary Examiner*—Henry F. Epstein
*Assistant Examiner*—James J. Seidleck
*Attorney, Agent, or Firm*—Edith A. Rice; Herbert G. Burkard

[57] ABSTRACT

A heat-recoverable wrap-around sleeve for pipe protection, with a patch-type closure.

The patch is heat-stable and comprises two polymeric layers bonded together through, for example, an open mesh glass-fibre fabric. No separate adhesive is required.

The hot modulus of one of the layers is low enough to enable it to bond to the overlapping edges of the wrap-around sleeve, and the hot modulus of the other layer is high enough to withstand installation temperature.

This new patch is easier to install and requires less materials than prior art patches, and does not need to be bonded to the sleeve in such a distinct heating step.

18 Claims, 1 Drawing Sheet

U.S. Patent    Feb. 7, 1989    4,803,104
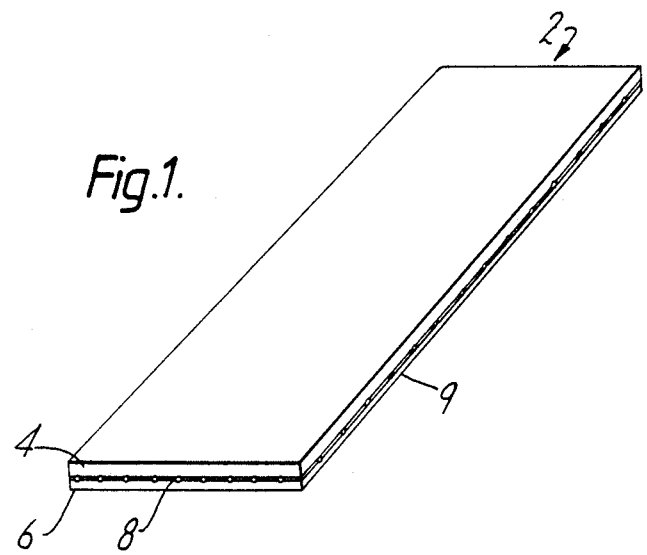
Fig.1.
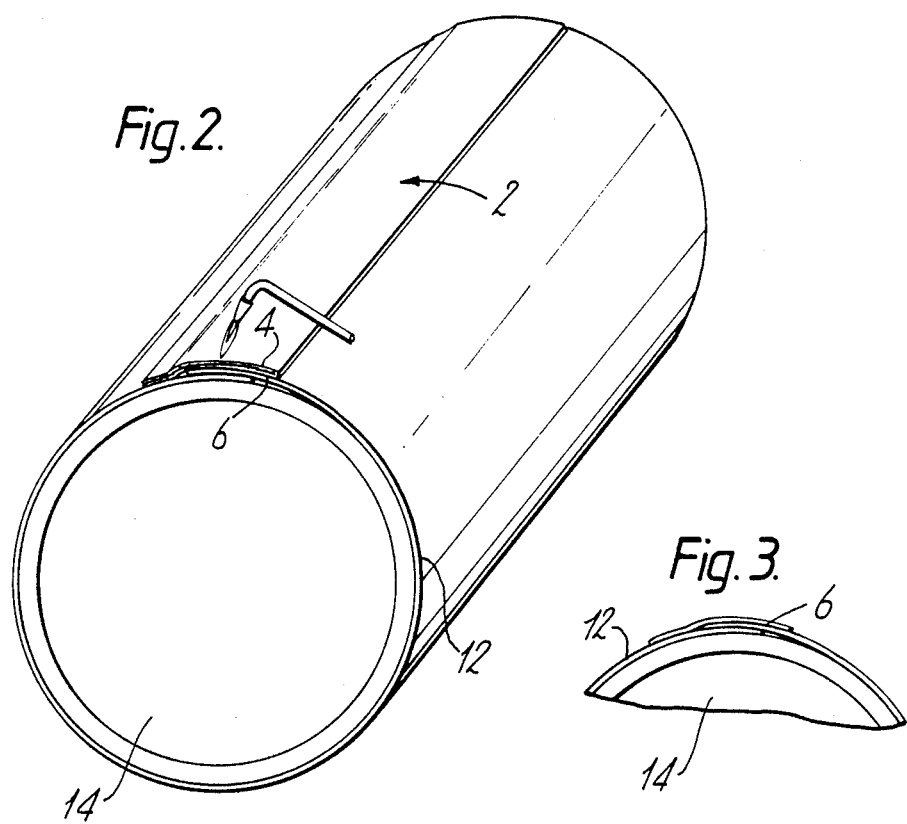
Fig.2.
Fig.3.

ARTICLE FOR JOINING DIMENSIONALLY RECOVERABLE PARTS

This application is a continuation of application Ser. No. 738,928 filed May 29, 1985, now abandoned.

BACKGROUND OF THE INVENTION

This invention relates to an article for joining dimensionally recoverable parts, and in particular to a patch for joining overlapping edges of a dimensionally recoverable cover.

A dimensionally recoverable article is an article the dimensional configuration of which may be made substantially to change when subjected to treatment. Usually these articles recover towards an original shape from which they have previously been deformed but the term "recoverable", as used herein, also includes an article which adopts a new configuration, even if it has not been previously deformed.

A typical form of dimensionally recoverable article is a heat recoverable article, the dimensional configuration of which may be changed by subjecting the article to heat treatment. In their most common form, heat recoverable articles comprise a shrinkable sleeve made from a polymeric material.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

Recoverable articles are frequently used to cover objects having a tubular or otherwise regular elongate configuration, to provide, for example, environmental sealing protection. Where no free end of the elongate object is available, it is common practice to use a so-called wrap-around article, that is an article, typically in the form of a sheet, that is installed by wrapping it around the object to be covered so that opposed longitudinal edges overlap. In order to hold the wraparound article around the object a closure means is applied to secure together the opposed longitudinal edges.

It is known from U.S. Pat. No. 4,200,676 (Raychem Corporation) to use, as a closure means for a wraparound article, a laminar strip, known as a "patch closure", comprising layer of a cross-linked hot melt adhesive coated on one surface of a reinformced polymer layer. The patch strip is positioned along the closure line and the layer of adhesive activated by heating to provide a secure bond between the overlapping edges of the wraparound article.

Another known wrap-around article is described in European patent application Publication No. 100170 (Shaw Industries Ltd). It comprises a single sheet layer of heat-shrinkable polyolefin material. Overlapping edges of the wrapped sheet are held together simply by heating the sheet to cause the edges to weld to each other. No separate patch is used.

SUMMARY OF THE INVENTION

It is an object of the present invention to provide a patch closure, which can be used for a wraparound article, which is simple to make, which does not use a separate adhesive inner layer, as required with the known patch closure described above, and which can resist high forces of recovery exerted by the recovering cover which it joins. This and other objects are accomplished in the present invention by using a patch comprising a laminate of two polymeric layers and an intermediate reinforcing layer, and by carefully selecting the hot modulus and/or the cross-link density of the two layers.

The present invention provides a dimensionally stable closure patch for joining overlapping edges of a dimensionally recoverable polymeric cover, comprising first and second polymeric layers bonded to each other through an apertured reinforcing layer sandwiched therebetween, wherein the second layer is either non cross-linked or has a hot modulus sufficiently low such that it can fuse when the patch is heated to form a bond to the recoverable cover, and wherein the first layer is cross-linked, and immediately prior to bonding has a hot modulus sufficiently low that it is compatible with and can bond to the second layer, and at least when the patch is heated to bond it to the recoverable cover, has a hot modulus sufficiently high that it does not melt.

DETAILED DESCRIPTION OF THE INVENTION

The compatibility of different polymeric compositions depends upon a variety of factors, including both the chemical natures of the polymers and the other ingredients, e.g. fillers, of the compositions. Those skilled in the art will have no difficulty in determining mining whether any two particular compositions are compatible. In many (but by no means all) cases, compatibility is the result of substantial amounts of common recurring units in the polymers of two compositions, as for example when at least 10%, preferably at least 30%, of the recurring units in the polymeric component of the first composition are the same as at least 10%, preferably at least 30%, of the recurring units in the polymeric component of the second composition, these percentages being based on the number of recurring units.

The hot modulus of the first layer, prior to bonding to the second layer, is selected to be sufficiently low to allow it to fuse to bond to the second layer.

To achieve fusion of one or both of the polymers the polymers are preferably above their softening point (in the case of crystalline polymers above their crystalline melting point).

The present invention provides a "heat stable article" which, in contrast to a heat recoverable article, is one which does not recover when subjected to heat treatment.

The term "hot modulus" as used herein is defined as the ratio of stress:strain of a material measured as 100% strain at 150 C when the material is being pulled at a rate of 50 mm/minute.

The first polymeric layer provides a backing layer and the second polymeric layer provides the layer that contacts and bonds to the overlapping edges of the recoverable polymeric cover.

We have surprisingly found that by selecting the hot moduli of the first and second polymeric layer, for example by controlling the degree of cross-linking, a laminar patch may be produced wherein immediately prior to bonding, the hot moduli of the two layers are sufficiently compatable to allow them to bond to each other, while when the patch is heated to install it, the hot modulus of the first, backing layer is sufficiently high to withstand melting when heated, and the hot modulus of the second layer is sufficiently low to enable it bond to the overlapping edges of the recoverable cover.

Since the patch of the present invention does not have a separate adhesive layer on its bonding surface it is easier to install than the known patch. The second layer of the present patch can be contrasted with an adhesive, since unlike an adhesive it does not flow to wet the substrate to which it is to be bonded. A particular advantage of the patch according to the invention is that it can be installed on a heat recoverable cover simultaneously with the recovery of the cover, and, to a substantial extent does not slip relative to the cover during installation. In contrast, in order to install the known patch it is necessary to install the patch by first heating, then cooling the patch sufficiently for the adhesive to harden, before heat is applied to recover the cover. Also when the cover is heated, to effect recovery, care must be taken to avoid reheating the patch area since this would result in remelting of the adhesive and slippage of the patch. In general the recovery heat cannot be completely shielded from the patch area, and thus in order to prevent slippage it is necessary to have a relatively large overlap of the patch over the cover. Since the patch of the present invention does not slip, narrower patches can be used than known hitherto. This advantageously gives a saving in the amount of material required.

The present patch also allows savings to be made in the material of the cover; this arises, at least in part, from the thinness of the patch in the absence of a layer of adhesive, which minimises the barrier to heat transfer. Thus the extent of the overlap of the edges wrapped around cover can be reduced such that the overlap region is wholly under the patch, without great risk of insufficient heat being supplied to the overlap region to seal the cover along the join.

Optionally, the patch of the present invention may be attached to the heat recoverable cover which it is to close, before installation of the cover, for example by means of a mechanical joining arrangement that penetrates the patch and/or the cover such as stitching or stapling, as disclosed in our EP-A-137648, or by means of an adhesive. This reduces the chances of misplacing of the patch by the installer. The patch will generally be attached at or towards an edge of the cover although the attachement of the patch to the cover may be inset from an edge to define a flap which can underly the overlapping portions of the cover. The positive location of the patch is advantageous, since smaller patches may be used which allow savings to be made.

The hot moduli of the first and second polymeric layers may be the same or different. Preferably the hot modulus of the first, backing layer is higher than the hot modulus of the second layer or the first, backing layer has a hot modulus and the second layer is non crosslinked.

For any given polymeric material a range of hot moduli may be used to provide an operable patch. This operable range will vary depending on the materials selected for use. The minimum and maximum limits of these ranges are determined by the functions the patch must perform.

For the first, backing layer the minimum limit of the hot moduli is that which is necessary to avoid total melting of the two-layer patch when heat is applied to install the patch.

In a preferred embodiment the first, backing polymeric layer contains carbon black to increase the conductivity of the polymer, preferably greater than 20% carbon black. Inclusion of carbon black lowers the minimum limit of the hot modulus of the backing layer, since the carbon black rapidly dissipates the heat applied during installation of the patch.

The upper limit of the hot modulus of the first, backing layer prior to bonding to the second layer is determined by the ease of lamination of the first, backing layer with the second layer. If too high a hot modulus is used, the second layer will not bond to the first, backing layer.

For the second polymeric layer, the maximum limit of the hot modulus is determined by the heat needed to fuse the polymer to install the patch. In general the higher the hot modulus the higher the heat flux required to install the patch.

The hot modulus of the polymeric layers can conveniently be controlled by varying the cross-link density. In general the higher the cross-link density the higher the hot modulus.

In a preferred embodiment the second layer is not cross-linked i.e. the cross-link density is zero. In this case, for most polymeric materials the term "not modulus" has no meaning since the material will melt below the hot modulus test temperature of 150° C.

The composition of the polymer used for the first and second polymeric layers may be the same or different. Preferably the polymer used is the same. This is advantageous for manufacturing.

As examples of polymeric materials that may be used for the layers there may be mentioned polypropylene, poly(butene-1), copolymers of ethylene, propylene, butene-1, and hexene-1, copolymers of ethylene with vinyl acetate, acrylic acid or esters, methacrylic acid or esters, wherein the ethylene predominates, blends of the above polymers and blends of the above polymers with elastomers. In a particularly preferred patch one, or more preferably both, of the layers comprises polyethylene or a blend containing polyethylene, especially preferably high density polyethylene or a blend thereof.

Where a layer of the patch comprises polyethylene, or a blend containing polyethylene, it is preferred that the material is predominantly polyethylene. Preferably the material comprises at least 75% by weight polyethylene.

Small amounts of other additives, for example flame retardants and antioxidants may also be included in the polymeric layers depending on the intended application of the patch-closed cover.

Preferably the first backing layer is cross-linked to have a hot modulus in the range 0.8 Kg/cm$^2$ to 2.5 Kg/cm$^2$. Preferably, the first layer has a hot modulus in the range 1 kg/cm$^2$ to 2.5 Kg/cm$^2$. Especially preferably the first layer has a hot modulus in the range 1.5 to 2.5 Kg/cm$^2$. Most preferably the hot modulus is about 2.5 Kg/cm$^2$.

Preferably the maximum cross-link density of the second polymeric layer is such as to produce a maximum hot modulus of 2.5 Kg/cm$^2$ more preferably a maximum hot modulus of 1 Kg/cm$^2$. Especially preferably the second polymeric layer is non cross-linked.

The above stated preferred cross-link densities and hot moduli are particularly preferred where the layers comprise polyethylene or a polymer blend comprising predominantly polyethylene.

The two layers may be cross-linked to the same or to a different extent. The first layer is always cross-linked, but the second layer may be zero, i.e. noncross-linked. Preferably the first, backing layer is cross-linked to a greater extent than the second layer. Cross-linking may be achieved by irradiating the material with a beam of high energy electrons, and a difference in the cross-link density between the layers may be achieved by irradiating one (preferably the first backing) layer with a higher beam does than the other (preferably the second) layer, for example for irradiating it for a longer time, or by use of additives which enhance or retard radiation cross-linking.

In a preferred embodiment the same composition polymer is used for the first and the second layers and the first layer is more cross-linked than the second. This advantageously results in a higher hot modulus in the first layer than in the second layer.

The thickness of the patch is preferably less than 1.5 mm, more preferably less than 1 mm. A thin patch is advantageous since it minimises the step at the overlap region, which, if high, might be subject to peel forces. A thin patch is also advantageous since the heat transfer therethrough is higher than through a relatively thicker patch. This is particularly advantageous when the patch is installed on a heat recoverable cover.

The thickness of the backing layer is preferably sufficiently thick to prevent heat applied from the outer surface of the patch adversely affecting the reinforcing layer sandwiched between the polymeric layers. In a preferred embodiment the first, backing polymeric layer is about 0.6 mm thick.

The second polymeric layer does not provide any protective function for the sandwiched reinforcing layer, and accordingly is advantageously thinner than the first, backing layer. In a preferred embodiment the second layer is about 0.3 mm thick. Thin second layers, of the order of 0.3 mm thick, are particularly preferred where the the cross-link density of the second layer is low, or zero. This is because the lower the cross-link density the more flowable the polymer on heating. Thus if a thick second layer is used the first polymer layer and reinforcing layer may slip during installation on the relatively thick fused second layer underneath. In contrast where a thinner layer is used there is friction of the first polymer layer and/or the reinforcing layer with the recoverable cover which minimises such slippage.

The apertures of the reinforcing layer are preferably regularly arranged, and the apertured reinforcing layer preferably comprises a fabric layer. Preferably a glass fibre fabric is used. Alternative fibres which may be used in a reinforcing include Kevlar (Trade Mark), polyamide and polyester fibres. Preferable the apertures are large relative to the surface area of the reinforcing layer so that there is a maximum contact area between the two polymeric layers through the apertures. Preferably an apertured layer having at least 90% open space is used.

It is preferred that the reinforcing layer is as thin as possible, consistent with adequate strength and sufficient open space, in order that air is not trapped in the apertures of the reinforcing layer between the first and second polymeric layer. The thickness of the reinforcing layer is preferably less than 0.3 mm, more preferably about 0.25 mm.

An example of a suitable reinforcing fabric layer is sold by Syncoglas under the Trade Mark Traliglas 96(AG), which has the following construction.

Glass fibres coated with an anti-gliss layer of polyvinylacetate.
Four fibres/cm in warp direction, thickness 34 tex
Four fibres/cm in weft direction, thickness 68 tex
weight 55 g/cm$^2$
94% open space.

The reinforcing layer is preferably embedded in one or both of the polymeric layers during manufacture of the patch.

The reinforcing layer prevents or at least minimises elongation in width of the patch which might otherwise result due to the recovery forces which act on it during recovery of the cover the overlapping edges of which are joined by the patch.

The patch may be constructed such that the angle between the wrap or the weft fibres of the reinforcing fabric and the principle direction of recovery of the wraparound cover has any value from 0° to 90° inclusive. Preferably, however, the warp and weft fibres are arranged at an angle such that they can accommodate a change in length of the patch on recovery of the sleeve. The angle of the warp and weft fibres to the principal direction of recovery of the sleeve may be for example from 15° to 75°, more preferably from 30° to 60°, especially from 40° to 50°, for example about 45°. This allows the fibres of the patch to accommodate small changes in the width of the cover on recovery thereof, measured perpendicular to the direction of recovery, generally along one or both of the overlapping edges. The change in length of the patch can be accommodated by changing of the angle between the warp fibres and the weft fibres of the fabric. The patch may be so arranged by cutting an appropriately shaped piece of fabric or laminated patch construction from a sheet, or directly by weaving a piece of fabric suitable for use in a patch with the angles of the warp and weft within the limits mentioned above. By appropriate choice of the warp and weft fibres angles the patch can resist width elongation due to the recovery forces of the sleeve, whilst accommodating small changes in the width of the sleeve and thereby minimising wrinkling of the patch.

The resistance to elongation of the patch is particularly important where the patch is used to join the overlapping edges of a cover that recovers with a high recovery force. For covering certain objects for certain applications it is advantageous to use a recoverable polymeric cover that has a high crystallinity and a high hot modulus. Covers with a high crystallinity and hot modulus, however, recover with a high recovery force and hence exert a high force on whatever closure mechanism is used to secure the recovering wraparound cover. The patch of the present invention may advantageously be used to join the overlapping edges of recoverable wraparound cover having a crystallinity above 25% and a hot modulus above 1 Kg/cm$^2$. Preferred embodiments of the present invention may advantageously be used to join the overlapping edges of a recoverable wraparound cover having a crystallinity above 35% and a hot modulus above 2 Kg/cm².

The second layer of the patch provides a bond to the cover that has particularly good shear strength. In one embodiment the peel strength is improved by providing two heat activatable, preferably hot melt, adhesive strips on the surface of the second layer, preferably on opposite edges of the patch, such that when the patch is installed each strip extends generally parallel to the closure line. As examples of heat activatable adhesives that may be used there may be mentioned polyamides or E.V.A.-based polymers. In another embodiment pressure sensitive adhesive strips, for example adhesive strips comprising acrylics, are used in place, or in addition to, the heat activatable adhesive strips.

The present invention also provides a method of making a heat stable patch for joining overlapping edges of a recoverable cover, comprising:

(a) cross-linking a first polymeric layer; and (b) bonding a second polymeric layer to the first polymeric layer through an apertured reinforcing layer so as to sandwich the apertured reinforcing layer therebetween, wherein the second layer is either noncross-linked or has a hot modulus sufficiently low that the layer can fuse when the patch is heated to form a bond to the recoverable cover, and wherein immediately prior to bonding it to the second layer, the first cross-linked layer has a hot modulus sufficiently low that it is compatible with and can bond to the second layer, and at least when the patch is heated to bond it to the recoverable cover, has a hot modulus sufficiently high that it does not melt.

The patch of the present invention is installed by heating the patch. Preferably the patch is installed by heating with a flame for example from a gas torch which is prefrerably directed over the first layer of the patch. Application of heat causes the second layer to fuse and hence to bond to the overlapping edges of the cover. The patch is preferably used to join the overlapping edges of a heat recoverable cover. In this case the heat source used to recover the cover is also preferably used to install the patch.

Preferably the temperature under the patch during installation, i.e. the temperature required to fuse the second layer and thereby bond the patch to the cover, is in the range 150° C. to 170° C.

The present invention also provides a closure patch for use with a heat recoverable wraparound cover, which comprises a layer of a polymeric material that is substantially non-melting at the temperature to which the cover is heated to effect recovery thereof, a layer of a sealing material and a fibrous reinforcing layer, the patch having a longitudinal edge which is arranged to lie substantially perpendicular to the principal direction of recovery of the cover when in use, and the angle between the said edge and the fibres of the reinforcing layer being from 15° to 75°, preferably from 30° to 60°.

The invention further provides an assembly for enclosing an article, comprising a heat recoverable wraparound cover and a closure patch attached to the cover preferably by means of stitches, the closure patch comprising a layer of a polymeric material that is substantially non-melting at the temperature to which the cover is heated to effect recovery thereof, a layer of a sealing material, and a fibrous reinforcing layer, the angle between the principal direction of recovery of the cover and the fibres of the reinforcing layer being from 15° to 75°, preferably from 30° to 60°.

In yet another aspect, the present invention provides a method of covering an elongate object, which comprises:

(a) wrapping a dimensionally recoverable polymeric cover around the object such that the opposite edges of the cover overlap;

(b) applying a closure patch over the closure line formed by the overlapping edges, the closure patch comprising a layer of a polymeric material that is substantially non-melting at the temperature to which the patch is heated to effect recovery thereof, a layer of a sealing material and a fibrous reinforcing layer, the patch being positioned such that the angle between the fibres of the reinforcing layer and the principal direction of recovery of the cover is between 15° and 75°, especially between 40° and 50°; and (c) heating the patch so as to activate the layer of sealing material to cause it to bond to the cover, and heating the cover to cause it to recover.

Advantageously since the fibres of the reinforcing layer are arranged at an angle between 0° and 90° to the principal direction of recovery of the cover, they can accommodate a change in the length of the patch (measured perpendicular to the direction of recovery of the sleeve) on recovery of the cover. The said angle is preferably from 15° to 75°, more preferably from 30° to 60°, especially from 40° to 50°, for example about 45°.

The fibrous reinforcing layer preferably comprises a fabric, such as a woven fabric. The fibres of the fabric are made up of a material having suitable mechanical and heat-resistant properties. Glass fibres are preferred.

The polymeric layer may comprise any of the materials listed above as suitable for use in the first and/or second layer of the first mentioned patch of the invention. Polyethylene or a blend thereof is preferred, especially when cross-linked.

The layer of sealing material may comprise a sealant such as a mastic, an adhesive such as a hot-melt adhesive or a heat-curable adhesive, or a material selected from the above mentioned list that is either non-cross-linked or has a hot modulus that is sufficiently low that is can fuse when the patch is heated to form a bond to the recoverable cover. Non-crosslinked polyethylene and a hot-melt adhesive are preferred sealing materials.

The patch may be attached to the recoverable cover by means of a mechanical joining arrangement that penetrates the patch or the cover or both, such as stitching or stapling, or by means of an adhesive.

Examples of the manufacture of a patch according to the present invention are now given:

EXAMPLE 1

A 0.6 mm thick layer of non cross-linked rubber modified high density polyethylene (first layer) was extruded onto a light weight open mesh glass-fibre fabric, and irradiated with a beam of high energy electrons so as to cross-link the polymer such that it had a hot modulus of 2.5 Kg/cm². A 0.3 mm thick layer of the same composition polymer, i.e. non cross-linked rubber modified high density polyethylene (second layer) was press-extruded onto the fibre-fabric side of the first layer such that the glass-fibre fabric was completely embedded between the two layers. The second layer remained non-cross linked.

EXAMPLE 2

A 0.4 mm thick layer of non cross-linked, modified, medium density polyethylene (first layer) was extruded onto a light weight open mesh glass fibre fabric. A 0.4 mm thick layer (second layer) of the same polymer composition was press extruded onto the fibre-fabric side of the first layer to embed the fabric as in Example 1. The polymer layers and embedded fabric were then irradiated with a beam of high energy electrons to cross-link the polymer layers such that each had a hot modulus of 1.8 Kg/cm$^2$.

EXAMPLE 3

A 0.6 thick layer of non-cross linked rubber modified high density polyethylene (first layer) was extruded onto an open mesh glass fibre fabric, and irradiated with a beam of high energy electrons to cross-link the polymer such that it has a hot modulus of 1.5 Kg/cm$^2$.

A 0.3 mm thick layer of the same non cross-linked, polymer (second layer) was press extruded onto the fibre-fabric side of the first layer such that the fibre fabric was completely embedded. The two polymer layers and embedded fabric were then irradiated to increase the hot modulus of the first layer by 1 Kg/cm$^2$ to 2.5 Kg/cm$^2$ and to introduce a hot modulus in the second layer of 1 Kg/cm$^2$. Thus the first layer, being irradiated twice, had a higher hot modulus than the first layer.

EXAMPLE 4

A 0.6 mm thick layer of non cross-linked rubber modified high density polyethylene (first layer) was extruded onto Traliglas 96(AG) glass-fibre so as to form a sheet in which the warp fibres run approximately parallel to an edge thereof. The sheet was irradiated with a beam of high energy electrons so as to cross-link the polymer such that it had a hot modulus of 2.5 Kg/cm$^2$. A 0.3 thick layer of the same composition polymer (second layer) was press extruded onto the fabric side of the first layer such that the glass-fibre fabric was completely embedded between the two layers. The second layer remained non-crosslinked. A substantially retangular closure patch was cut from the sheet with the fibres of the reinforcing fabric at an angle of approximately 45° to the edges of the patch.

The patch was installed as closure system on wraparound sleeve which had a width of at least 450 mm. The sleeve was heat-shrinkable in a direction perpendicular to the overlapping edges of the wrapped around sleeve. On application of heat to the sleeve effect shrinking, the patch was able to accommodate changes in the dimension of the sleeve parallel to the overlapping edges without wrinkling.

EXAMPLES 5 AND 6

Closure patches, in which the fibres of the reinforcing fabric where at an angle of 45° to the edges of the patches, were cut from laminated sheets made according to the procedures set out in examples 2 and 3. On installation according to the method of Example 4, the patches were able to accommodate changes in the dimension of the sleeve parallel to the overlapping edges thereof without wrinkling.

EXAMPLES 7 TO 9

Rectangular patches, in which the fibres of the reinforcing fabric were at an angle of 45° to the edges thereof, were prepared according to the procedures set out above in examples 1 to 3, by ensuring that the reinforcing fibres extend approximately 45° to the edges of the laminate. Patches were then cut from the laminate, the cutting lines extending substantially perpendicular to an edge of the sheet. On installation according to the method of Example 4, the patches were able to accommodate changes in the dimension of the sleeve parallel to the overlapping edges thereof without wrinkling.

An embodiment of a patch according to the present invention, and its installation to join according edges of a recoverable wraparound cover, will now be described by way of example with reference to the accompanying drawings, wherein:

DESCRIPTION OF THE DRAWINGS

FIG. 1 is a perspective view of a patch according to the present invention:

FIG. 2 is a perspective view of the patch of FIG. 1 positioned on a recoverable wraparound cover before FIG. 3 is a part end view of the patch and cover of FIG. 2 after recover of the cover.

Referring to the drawings, FIG. 1 shows a heat stable patch 2 comprising a first layer 4 of high density polyethylene cross-linked by electron beam irradiation such that it has hot modulus of 2.5 Kg/cm$^2$, and a second layer 6 of noncross-linked high density polyethylene. The polyethylene layers 4, 6 sandwich and embed between them a glass fibre fabric layer 8, in which the angle between the warp fibres and the edge 9 of the sheet is about 45°. The first layer 4 is 0.6 mm thick, and the second layer 6 is 0.3 mm thick. The glass fibre fabric layer is 0.2 mm thick and is embedded in the polymeric layers such that the total patch thickness is 1 mm.

FIG. 2 shows the patch positioned over the overlapping edges of a wraparound heat recoverable cover 12 which is enclosing a pipe 14.

FIG. 3 shows the arrangement of FIG. 2 after heat has been applied by a gas torch. The cover 12 has recovered into conformity with the pipe 14, and the second layer 6 has fused. The second layer 6 thus bonds to the cover 12. The first layer 4, having a higher hot modulus than the second layer 6 does not melt. The fabric layer 8 also minimises elongation of the patch under the action of the recovery forces exerted by the recovering cover 12.

We claim:

1. A heat stable closure patch for joining overlapping edges of a dimensionally recoverable polymeric cover, comprising first and second polymeric layers of substantially the same composition bonded to each other through an apertured reinforcing layer sandwiched therebetween, wherein the second layer is either non cross-linked or has a hot modulus sufficiently low that it can fuse when the patch is heated to form a bond to the recoverable cover, and wherein the first layer is cross-linked, and has a hot modulus sufficiently low that it is compatible with and can bond to the second layer, and sufficiently high that it does not melt when the patch is heated to bond it to the cover.

2. A closure patch according to claim 1, wherein the hot modulus of the first layer is in the range 0.8 to 2.5 Kg/cm$^2$.

3. A closure patch according to claim 1, wherein the hot modulus of the second polymeric layer is less than 2.5 Kg/cm$^2$.

4. A closure patch according to claim 1, wherein the first layer contains carbon black.

5. A closure patch according to claim 1 where both of the layeers comprises polyethylene.

6. A closure patch according to claim 5, wherein both of the layers comprises a polyethylene blend which comprises at least 75% polyethylene.

7. A closure path according to claim 1, wherein both polymeric layers have been cross-linked by irradiating them with a beam dose of high energy electrons.

8. A closure patch according to claim 7, wherein the first layer has been subjected to a higher electron beam dose than the second layer.

9. A closure patch according to claim 1, wherein the patch is less than 1.5 mm thick.

10. A closure patch according to claim 1, wherein the reinforcing layer comprises a fabric mesh.

11. A closure patch according to claim 10, which is arranged such that when it is installed on the overlapping edges of a dimensionally recoverable cover, the angle between any of the fibers of the fabric and the principle direction of recovery of the cover is between 15° and 75°.

12. A closure patch according to claim 11, wherein the said angle is between 30° and 60°.

13. A closure patch according to claim 1, which is attached to a dimensionally recoverable cover.

14. A closure patch according to claim 13, which is attached to the cover by means of a mechanical joining arrangement that penetrates the patch and/or the cover.

15. A closure patch according to claim 14, wherein the second layer is provided with strips of adhesive on opposite edges of the patch.

16. A method of covering an elongate object, which comprises:
(a) wrapping a dimensionally recoverable polymeric cover around the object such that the opposte edges of the cover overlap;
(b) applying a closure patch over the closure line formed by the overlapping edges, the closure patch comprising a layer of a polymeric material that is substantially non-melting at the temperature to which the patch is heated to effect recovery thereof, a layer of a sealing material and a fibrous reinforcing layer, the patch being positioned such that the angle between any of the fibres of the reinforcing layer and the principal direction of recovery of the cover is between 15° and 75°; and
(c) heating the patch so as to activate the layer of sealing material to cause it to bond to the cover, and heating the cover to cause it to recover.

17. An assembly for enclosing an article, comprising a heat recoverable wraparound cover and a closure patch attached to the cover, the closure patch comprising a layer of a polymeric material that is substantially non-melting at the temperture to which the cover is heated to effect recovery thereof, a layer of a sealing material, and a fibrous reinforcing layer, the angle between the principal direction of recovery of the cover and any of the fibres of the reinforcing layer being from 15° to 75°.

18. An assembly for covering an elongate substrate which comprises:
(a) a dimensionally recoverable polymeric cover capable of being wrapped around the substrate such that opposite edges of the cover overlap and
(b) a heat stable closure patch capable of joining the overlapped edges together, the patch comprising first and second polymeric layers of substantially the same composition bonded to each other through an apertured reinforcing layer sandwiched therebetween, wherein the second layer is either non cross-linked or has a hot modulus sufficiently low that it can fuse when the patch is heated to form a bond to the recoverable cover, and wherein the first layer is cross-linked, and has a hot modulus sufficiently low that it is compatible with and can bond to the second layer, and sufficiently high that it does not melt when the patch is heated to bond it to the cover.

* * * * *